United States Patent Office
3,631,162
Patented Dec. 28, 1971

3,631,162
ANTISTATIC ADDITIVE FOR OLEFIN POLYMERS
Michael C. McGaugh, Angleton, and David R. Howell, Lake Jackson, Tex., and Bruce L. Oliver, Midland, Mich., assignors to The Dow Chemical Company, Midland, Mich.
Filed Mar. 11, 1970, Ser. No. 18,522
Int. Cl. C08f 29/02, 29/04, 45/60
U.S. Cl. 260—94.9 GB
7 Claims

ABSTRACT OF THE DISCLOSURE

Antistatic properties of olefin polymers are improved by a marked degree by interspersing therein a small amount of an antistatic additive comprising N-(2-hydroxy-3-dodecyloxypropyl)ethanolamine and N,N-bis(2-hydroxyethyl)alkylamine.

BACKGROUND OF THE INVENTION

This invention relates to antistatic plastic materials, and more particularly, to olefin polymers containing antistatic additives.

Polymeric plastic compositions typified by olefin polymers, e.g., homopolymers and copolymers of ethylene, propylene and butene-1; polyvinyl chloride, vinyl chloride/vinylidene chloride copolymers; polystyrene; styrene/butadiene copolymers and the like tend to accumulate surface electric charges during fabrication, and subsequently, during the life of the fabricated articles. As a result of the charges produced on such articles dust and lint are attracted to the surface thereby causing fabrication problems. This electrostatic characteristic is particularly troublesome in the fabrication of sheets, films or filaments as the static charges tend to cause the articles to cling together or to the processing equipment itself. Another disadvantage of high electrostatic charge is the danger involved when such materials are stacked or formed in the presence of highly volatile inflammable materials. Such charged bodies may also give other troublesome effects such as shock to the person contacting the charged body, radio interference, etc. For these reasons, it is obviously desirable to reduce the tendency of such plastic compositions to accumulate static charge.

To decrease static charge on plastic articles, it has been a common practice to apply various known antistatic materials, e.g., quaternary ammonium salts, to the surface of the plastic article. Unfortunately surface treatment is often of only temporary assistance. Application of a coating composition containing antistatic agent has also been proposed but coating processes are costly and the antistatic properties achieved are not permanent.

It is also well known to incorporate an antistatic additive such as hydroxyethyl alkyl amine into the plastic material during compounding, molding or fabrication steps. As the incorporated additive exudes to the surface of the plastic article, it adsorbs moisture thereby increasing the conductivity of the surface of the polymer article. It is necessary that such additives have sufficient antistatic activity when employed in fairly low concentrations. The additive also should be compatible with the polymer and be easy to incorporate into the polymer. The antistatic properties of the agent should be substantially permanent and should outlast exposure to the high temperatures typically employed in molding or fabrication of the polymer. Unfortunately antistatic additives known heretofore have not fully and satisfactorily met all of the above requirements.

Therefore it would be highly desirable to provide an antistatic additive capable of satisfying such requirements.

SUMMARY OF THE INVENTION

Accordingly the present invention is an antistatic additive which satisfies the above-stated requirements. This additive which is advantageously employed in olefin polymers consists essentially of (a) from about 25 to about 75 weight percent of N-(2-hydroxy-3-dodecyloxypropyl)ethanolamine and from about 25 to about 75 weight percent of N,N-bis(2-hydroxyethyl)alkylamine.

This antistatic additive is particularly effective in rendering fabricated or molded articles of olefin polymers antistatic, especially those articles which are fabricated or molded at high temperatures. In fact the antistatic additive of this invention when incorporated into α-olefin polymers, not only enhances the antistatic character of the surfaces of the resulting α-olefin polymer article, but does so synergistically. In addition, the antistatic effect imparted by this additive begins almost immediately after the additive is incorporated into the polymer and continues for very long periods after the polymer is fabricated or molded. Polymeric compositions prepared in accordance with this invention are effectively employed as bottle caps, bottles, aerosol can covers, container lids and the like which are subject to being stored on open shelves where dust accumulation is a problem.

DESCRIPTION OF THE PREFERRED EMBODIMENTS

Figure 1:
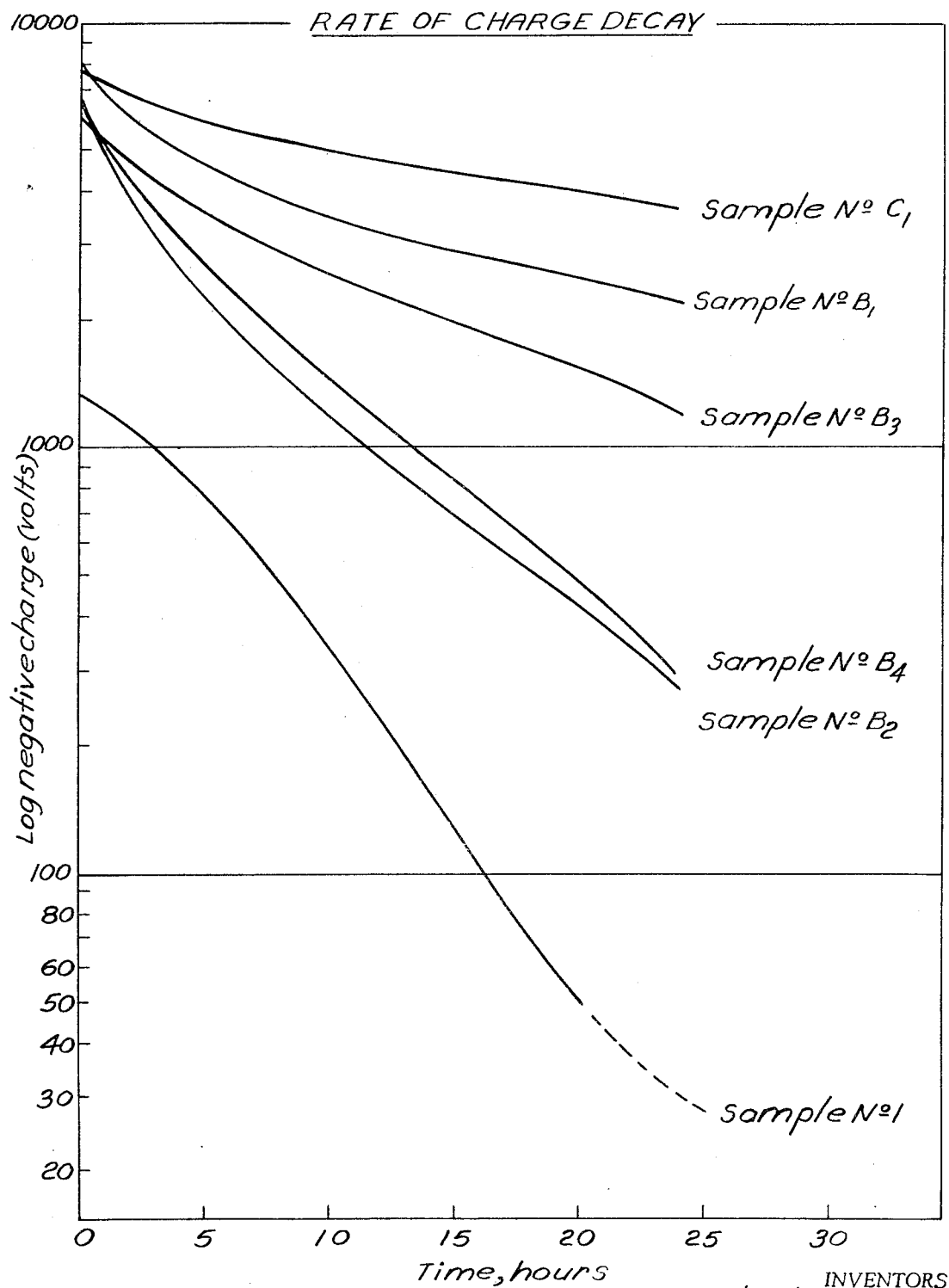
FIG. 1 is a graphic chart depicting rate of charge decay of polymer test tabs as a function of log negative charge (volts) versus time (hours) as recorded in Table I.

Olefin polymers advantageously affected by the antistatic additive of this invention are the normally solid polymers of α-olefins such as ethylene, propylene, butene-1 and the like; diolefins such as butadiene and isoprene and olefinically substituted aryl compounds such as styrene and substituted styrenes. Olefin polymers exhibiting especially improved antistatic properties in the practice of this invention are high and low density homopolymers and copolymers of ethylene, polypropylene and other polymers of α-olefins.

The antistatic additive of the present invention consists essentially of (a) from about 25 to about 75 weight percent of N-(2-hydroxy-3-dodecyloxypropyl)ethanolamine, preferably from about 30 to about 70 weight percent, and (b) from about 25 to about 75 weight percent, preferably from 30 to 70 weight percent of N,N-bis(2-hydroxyethyl)alkylamine wherein alkyl has from 14 to 22 carbon atoms. In especially preferred embodiments, the ratio of the two components is about 1:1. Each component of the additive is readily obtained either from commercial sources or by preparing each in a conventional manner.

The antistatic additive is employed in the olefin polymer in amounts ranging from about 0.1 to about 1.2 weight percent based on the total polymer composition, preferably from about 0.2 to about 1.0 weight percent, especially from about 0.4 to about 0.8 weight percent. The resulting polymer composition which also forms a part of this invention is made by incorporating the additive into the olefin polymer. Generally such incorporation is performed by any one of a number of well known methods, such as dry blending, roll compounding, extrusion, solvent mixing and the like. For example, such incorporation can be performed by heating or otherwise softening the olefin polymer to a workable consistency and then working the antistatic additive into the softened polymer as by roll compounding until a substantially uniform mixture or dispersion is obtained.

It is to be understood that the antistatic olefin polymer composition can also contain other additives such as antioxidants, heat stabilizers, ultraviolet light inhibitors, anticorrosion additives, antistatic agents, foaming agents, plasticizers, waxes, mold release agents, slip agents, antiblocking agents, fillers, extenders and the like.

The antistatic olefin polymer composition is then usually formed into articles such as pellets, sheeting, films, bars, tubes, filaments, specially shaped articles and the like by conventional casting and molding techniques which include extrusion, compression and injection molding, blow molding and the like.

The following examples are given to further illustrate the invention and should not be construed as limiting the scope of the invention. In these examples all parts and percentages are by weight unless otherwise indicated.

Example 1

An antistatic additive consisting of 2 parts of N-(2-hydroxy-3-dodecyloxypropyl)ethanolamine and 2 parts of N,N-bis(2-hydroxyethyl)alkylamine wherein alkyl has 14 to 18 carbon atoms is dry blended with 1000 parts of polyethylene having a density of 0.967 and a melt index as determined by ASTM D–1238–65T(E) of 6.0 decig/min. The resultant blend is compounded and extruded at 350° F. into test tabs (Sample No. 1). Antistatic properties of the test tabs are measured and recorded in Table I.

For the purposes of comparison and to show the synergistic results achieved by the antistatic additive of this invention, a control test tab ($C_1$) of the polyethylene of Example 1 and comparative test tabs ($B_x$) of several blends of the polyethylene and 2 parts and 4 parts of each of the above identified antistatic agents are prepared. The antistatic properties of the control and comparative test tabs are determined according to the test methods employed in Example I and the results are recorded in Table I.

TABLE I

| Sample No. | Antistatic agent,[1] pts./1,000 pts. of polyethylene | Smoke chamber test[2] | Static charge,[3] volts | |
|---|---|---|---|---|
| | | | Initial | After 24 hours |
| 1 | 2A+2C | Medium soot | −1,360 | <−50 |
| $C_1$* | | Large soot | >−7,000 | −3,630 |
| $B_1$* | 2C | do | >−7,000 | −2,170 |
| $B_2$* | 2A | do | −6,930 | −270 |
| $B_3$* | 4C | do | −5,960 | −1,210 |
| $B_4$* | 4A | do | −6,300 | −285 |

[1] Antistatic agent C=N-(2-hydroxy-3-dodecyloxypropyl)ethanolamine. Antistatic agent A=N,N-bis(2-hydroxyethyl)alkylamine.
[2] Smoke chamber test—Test tabs of each sample are stroked 10 times with a paper towel and placed in random order in a chamber which is connected to a combustion drum. For four hours following stroking, the test tabs are allowed to stand in the chamber (open position) in air at 40% relative humidity and 75°C. The chamber door is then closed and a piece of filter paper (max. ash 0.000060 gm.) saturated with toluene is burned in the combustion drum. Immediately after combustion, air is circulated through the drum and chamber for 15 minutes. The test tabs are then removed and examined for amount of soot deposited on their surfaces with the lowest soot deposit indicating the test tab having the lowest static charge.
[3] Static charge—Test tabs of each sample are stroked ten times with a paper cloth at 75° F. and 42% RH. The static charge on the stroked surface of each tab is measured in volts with a static meter (Keithly Instruments, Cleveland, Ohio) having a detecting head with a low-noise connecting cable and a specially calibrated battery-operated electrometer. The method and device used for measuring static charge as recorded in Table I are more completely described in Valko, E. I. and G. C. Tesoro, "Antistatic Agents," Encyclopedia of Polymer Science and Technology, Vol II, 224–225 (1965).
* Not an example of the invention.

As evidenced by the static charges measured immediately and after 24 hours for each of the above samples, Sample No. 1, which is in accordance with the invention, has superior antistatic properties when compared with the other samples suggested by the prior art.

Specifically Sample No. 1, containing 4 total parts of antistatic additive/1000 parts of polyethylene, has an initial surface charge of −1360 volts and a surface charge after 24 hours of less than −50 volts, both of which measurements are markedly lower than the same measurements for Samples $B_5$ and $B_6$, containing 4 parts/1000 parts of the polyethylene of either one or the other component of the antistatic additive Sample No. 1.

Referring now to FIG. 1, there is illustrated a chart showing charge decay (Log Negative Charge, volts, vs. Time, hrs.) for several of the above samples. Log negative charge is a function of static charge as determined at various time intervals according to technique described in footnote (3) of Table I. As evidenced by FIG. 1, Sample No. 1 prepared in accordance with this invention dissipates static charge at a much faster rate than do the samples containing equivalent amounts of either Antistatic Agent A or C, thus establishing that the combination antistatic additive of Sample No. 1 possesses better antistatic properties than the sum of its parts, i.e., Sample Nos. $B_3$ or $B_4$.

In a second comparison employing Sample No. 1, Sample No. $D_1$ containing 2 parts of glyceryl monostearate (Antistatic Agent B) per/1000 parts of polyethylene of Sample No. 1, Sample No. $D_2$ containing 2 parts of Antistatic Agent C and 2 parts of Antistatic agent B per/1000 parts of polyethylene of Sample No. 1, and Sample No. $D_3$ containing 2 parts of Antistatic Agent A and 2 parts of Antistatic Agent B per/1000 parts of polyethylene of Sample No. 1 are prepared and formed into test tabs in the same manner used in preparing Sample No. 1. The antistatic properties of these comparative samples are measured and recorded in Table II along with the antistatic properties of Sample No. 1.

TABLE II

| Sample No. | Antistatic agent[1], pts./1,000 pts. of polyethylene | Smoke chamber test[2] | Static charge[3], volts | |
|---|---|---|---|---|
| | | | Initial | After 24 hours |
| 1 | 2A+2C | Medium soot | −1360 | <−50 |
| $D_1$* | 2B | Large soot | −5020 | −1250 |
| $D_2$* | 2C+2B | Medium soot | −1870 | a+245 |
| $D_3$* | 2A+2B | Large soot | −3350 | a+229 | a A positive value indicates that there is a positive flow of electrons from the measuring device to the test tab.
[1] Antistatic agent C=N-hydroxy-3-dodecyloxypropyl)ethanolamine. Antistatic agent A=N,N-bis(2-hydroxyethyl)alkylamine. Antistatic agent B=Glycerol monostearate.
[2] Same as in Table I.
[3] Same as in Table I.
* Not an example of the invention.

As evidenced by Table II, Sample No. 1 has considerably less initial surface charge and surface charge after 24 hours than do samples containing the same amounts of combination antistatic additives having an identical component and a different component from the components employed in Sample No. 1.

Example 2

An antistatic additive consisting of 4 parts of N-(2-hydroxy-3-dodecycloxypropyl)ethanolamine (Antistat C) and 4 parts of N,N-bis(2-hydroxyethyl)alkylamino (Antistat A) wherein alkyl has 14 to 18 carbon atoms is dry blended with 1000 parts of the polyethylene used in Example 1. The resultant blend is compounded and extruded into test tabs (Sample No. 2) in the same manner as in Example 1 and the antistatic properties of the test tabs are measured and recorded in Table III.

For the purposes of comparison and to show the synergistic results achieved by the antistatic additive of Sample No. 2, the antistatic properties of Sample Nos. $C_1$, $B_3$ and $B_4$ of Table I are also recorded in Table III. In addition, Sample No. $B_5$ containing 8 parts of Antistat C, and Sample No. $B_6$ containing 8 parts of Antistat A per/1000 parts of polyethylene are prepared and formed into test tabs. The antistatic properites of both samples are determined and recorded in Table II.

TABLE III

| Sample No. | Antistatic agent[1], pts./1,000 pts. of polyethylene | Smoke chamber test[2] | Static charge[3], volts | |
|---|---|---|---|---|
| | | | Initial | After 24 hours |
| 2 | 4A+4C | Small soot | −1835 | <−50 |
| C₁* | | Large soot | −7460 | −3630 |
| B₃* | 4C | ___do___ | −5960 | −1210 |
| B₄* | 4A | ___do___ | −6300 | −285 |
| B₅* | [4]8C | Medium soot | −2130 | −1020 |
| B₆* | [4]8A | ___do___ | −3730 | −2660 |

[1-3] Same as in Table I.
[4] Large amounts of the antistatic agent exude to the surface of the polyethylene.
*Not an example of the invention.

As evidenced in Table III static charges on Sample No. 2 initially and after 24 hours are significantly lower than the charges on any of the comparative samples at the same time. Specifically the initial charge of −1835 volts and charge of less than −50 volts after 24 hours measured for Sample No. 2 are significantly lower than charges measured after the same period for Sample Nos. $B_5$ and $B_6$, each of which contains the same amount of total antistatic agent as Sample No. 2.

Figure 2:
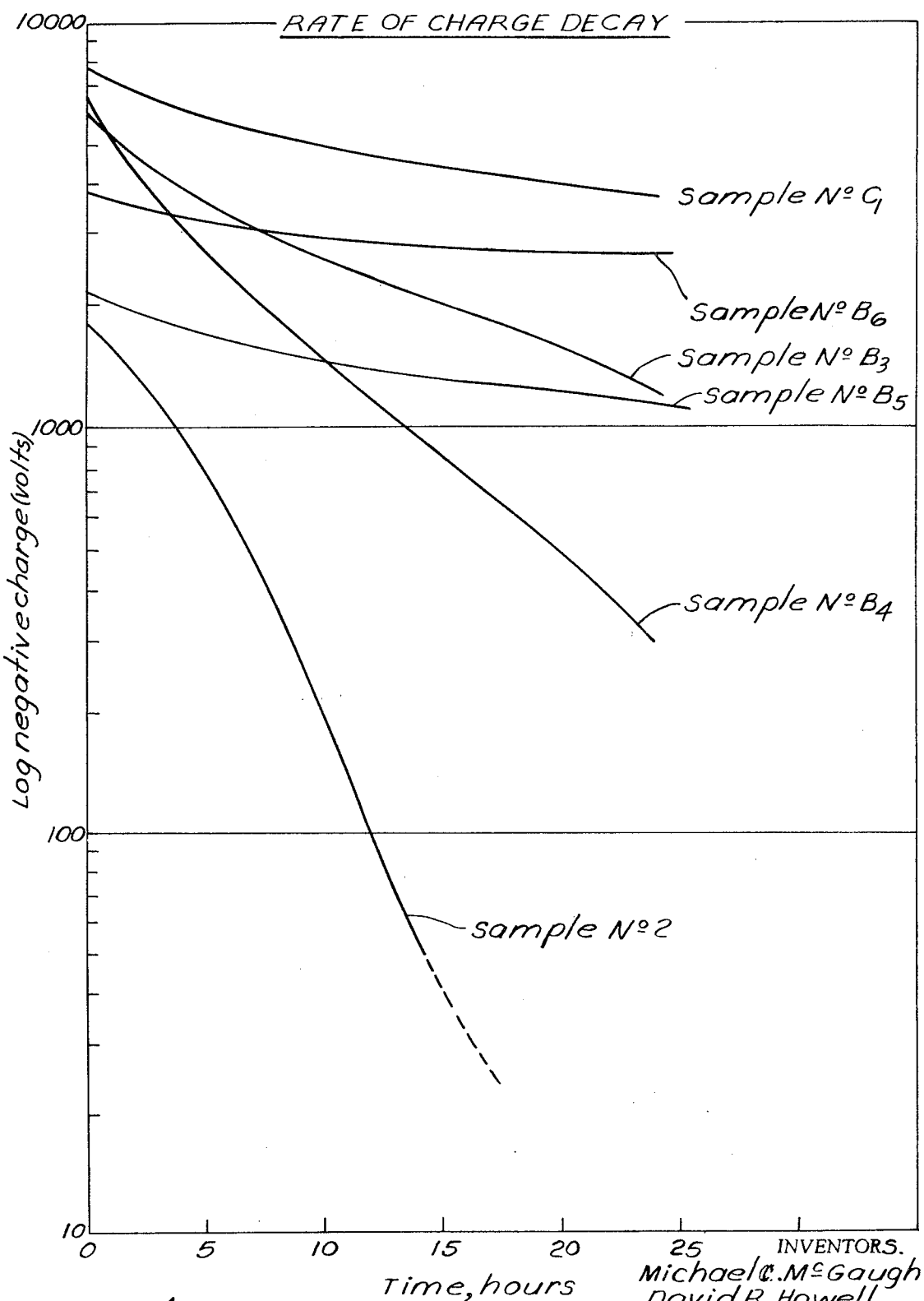
FIG. 2 is a graphic chart depicting rate of charge decay of polymer test tabs as a function of log negative charge (volts) versus time (hours) as recorded in Table III.

Referring now to FIG. 2, there is illustrated a chart showing charge decay (Log Negative Charge, volts, vs. Time, hrs.) for the above samples. As evidenced by FIG. 2, Sample No. 2 containing a suitable amount of the antistatic additive of this invention dissipates static charge at a much faster rate than do samples containing equivalent amount of either Antistatic Agent A or Antistatic Agent C, thereby establishing that the combination antistatic additive of Sample No. 2 possesses better antistatic properties than the sum of its parts, i.e., Sample No. $B_5$ or $B_6$.

Example 3

An antistatic additive consisting of 0.5 part of Antistatic Agent C and 0.5 part of Antistatic Agent A is dry blended with the polyethylene employed in Example 1 and formed into test tabs by the procedure described in Example 1. The test tabs (Sample No. 3) are charged and their antistatic properties are measured and recorded in Table IV.

Similarly prepared and charged test tabs of Sample No. $B_7$ containing 0.5 part of Antistatic Agent C and Sample. No. $B_8$ containing 0.5 part of Antistatic Agent A, are measured for surface static charge initially and after 24 hours. The results are recorded in Table IV for comparison purposes. Also recorded in Table IV are the antistatic properties for Sample Nos. $B_1$ and $B_2$ of Example 1.

TABLE IV

| Sample No. | Antistatic agent[1], pts./1,000 pts. of polyethylene | Static charge[2], volts | |
|---|---|---|---|
| | | Initial | After 24 hours |
| 3 | 0.5C+0.5A | −5980 | −620 |
| B₇* | 0.5C | −6400 | −2775 |
| B₈* | 0.5A | −6230 | −1610 |
| B₁* | 2C | >−7000 | −2170 |
| B₂* | 2A | −6930 | −270 |

[1] Same as in Table I.
[2] Same as (3) in Table I.
*Not an example of the invention.

An evidenced in Table IV, the static charge on the surface of Sample No. 3 initially and after 24 hours is lower than charge on Sample No. $B_1$ which contains double the amount of total antistatic agent. In addition, the static charge on Sample No. 3 is initially lower and not substantially higher after 24 hours than the charge on Sample No. $B_2$ which also contains double the amount of total antistatic agent.

Example 4

Several antistatic additives consisting of various amounts (as specified in Table V) of Antistatic Agents A and C are dry blended with several samples of the polyethylene according to Example 1 and molded into test quart containers (Sample Nos. 4–6). The quart containers are charged and their antistatic properties are measured and recorded in Table V.

For purposes of comparison a sample ($C_2$) of the polyethylene (containing no antistatic) is similarly molded into quart containers which are charged and measured for antistatic properties. The results are also recorded in Table V.

TABLE V

| Sample No. | Antistatic agent[1], pts./1,000 pts. of polyethylene | Static charge[2], volts | |
|---|---|---|---|
| | | Initial | After 24 hours |
| 4 | 2C+1A | <−10 | <−10 |
| 5 | 1.6C+.8A | <−10 | <−10 |
| 6 | 1.4C+.7A | <−10 | <−10 |
| C₂* | | −600 | −450 |

[1] Same as in Table I.
[2] Same as (3) in Table I.
*Not an example of the invention.

What is claimed is:

1. A synergistic antistatic additive for olefin polymers consisting essentially of components (a) from about 25 to about 75 weight percent of N-(2-hydroxy-3-dodecyloxypropyl)ethanolamine and from about 25 to about 75 weight percent of N,N-bis(2-hydroxyethyl)alkylamine wherein alkyl has from 14 to 22 carbon atoms.

2. A polymeric composition having improved antistatic properties comprising a normally solid olefin polymer and from about 0.1 to about 1.2 weight percent based on the weight of the polymer of the antistatic additive according to claim 1.

3. The polymeric composition according to claim 2 wherein the polymer is polyethylene.

4. The polymeric composition according to claim 2 wherein the olefin polymer contains from 0.2 to 1.0 weight percent of the additive.

5. The polymeric composition according to claim 2 wherein the olefin polymer contains from 0.4 to 0.8 weight percent of additive wherein the weight ratio of the components is 1:1.

6. The polymeric composition according to claim 2 wherein the olefin polymer is polyethylene and contains from ½ to 4 parts by weight of N-(2-hydroxy-3-dodecyloxypropyl)ethanolamine and from ½ to 4 parts by weight of N,N-bis(2-hydroxyethyl)alkylamine, alkyl having from 14 to 18 carbon atoms, per 1000 parts by weight of polyethylene.

7. The polymeric composition according to claim 6 wherein the polyethylene contains 2 parts by weight of N-(2-hydroxy-3-dodecycloxypropyl)ethanolamine and 2 parts by weight of N,N-bis(2-hydroxyethyl)alkylamine per 1000 parts by weight of polyethylene.

References Cited
UNITED STATES PATENTS 3,365,435  1/1968  Adams et al. _____ 260—93.7
3,485,786  12/1969 Rombusch _____ 260—94.9 X JOSEPH L. SCHOFER, Primary Examiner
W. F. HAMROCK, Assistant Examiner U.S. Cl. X.R.
260—88.2 S, 93.5 A, 93.7, 94.7 N, 96

UNITED STATES PATENT OFFICE
CERTIFICATE OF CORRECTION

Patent No. 3,631,162      Dated December 28, 1971

Inventor(s) Michael C. McGaugh, David R. Howell, Bruce L. Oliver

It is certified that error appears in the above-identified patent and that said Letters Patent are hereby corrected as shown below:

Column 3, Table I, under heading "Sample No.", change "$B_2$", second occurrence, to -- $B_3$ --.

Column 4, Table II, footnote 1, after "N" insert -- -(2 --.

Column 4, Example 2, line 60, change "alkylamino" to read -- alkylamine --.

Signed and sealed this 11th day of July 1972.

(SEAL)
Attest:

EDWARD M. FLETCHER, JR.
Attesting Officer

ROBERT GOTTSCHALK
Commissioner of Patents